United States Patent [19]

Zupanick

[11] 4,043,132
[45] Aug. 23, 1977

[54] METHOD AND APPARATUS FOR PREVENTING FLUID SOLIDIFICATION IN AN APERTURE

[75] Inventor: Joseph E. Zupanick, Richardson, Tex.

[73] Assignee: Sun Oil Company Limited, Toronto, Canada

[21] Appl. No.: 703,865

[22] Filed: July 9, 1976

[51] Int. Cl.² ............................................. E02B 9/02
[52] U.S. Cl. .................................... 61/1 R; 61/36 A; 138/93
[58] Field of Search ...................... 61/1, 35, 63, 36 A; 138/93, 32; 220/235, 233

[56] References Cited

U.S. PATENT DOCUMENTS

| | | | |
|---|---|---|---|
| 1,683,336 | 4/1928 | Cummings | 138/93 |
| 3,357,193 | 12/1967 | Fitzgibbon, Jr. | 61/35 |
| 3,365,894 | 1/1968 | Murati | 61/36 X |

*Primary Examiner*—Jacob Shapiro
*Attorney, Agent, or Firm*—J. Edward Hess; Donald R. Johnson; James H. Phillips

[57] ABSTRACT

A method of and apparatus for the installation and retrieval of instrumentation hardware supported through a hole in a section of ice is provided wherein an expansion member such as an inflatable bladder is utilized for displacing water normally subject to freezing within the hole. The inflatable bladder comprises an elongated expandable sleeve of sufficient length to substantially extend the ultimate depth of the hole in the ice for engaging and bearing against the sidewalls thereof. A portion of the hardware adapted for the surface support thereof may be disposed within the bladder as well as therebeneath and may be retrieved at a date subsequent to installation by deflating the bladder without the problem of said hardware being frozen in or beneath the ice. The configuration of the laterally expandable sleeve then permits structural interconnection from the top surface of the ice to the underneath side and communication with the environment therebeneath while providing lateral stability and preventing ice build-up which would adversely hinder its retrieval from the hole.

13 Claims, 4 Drawing Figures

METHOD AND APPARATUS FOR PREVENTING FLUID SOLIDIFICATION IN AN APERTURE

BACKGROUND OF THE INVENTION

The invention relates to a method and apparatus for preventing fluid solidification in an aperture, and, more particularly, to the utilization of an expansion member for positioning in a normally fluid filled cavity to prevent the fluid solidification therein.

For certain applications, such as drilling explorations in frozen Artic regions, it is desirable to install monitoring instrumentation in subfreezing areas. In particular, it has been shown to be advantageous to install instrumentation hardware including supporting struts and cables in floating ice sheets in order to monitor subsurface current characteristics such as water speed and direction as well as movement of the ice sheets themselves. Such monitoring has proven to be helpful in charting and evaluating Artic conditions which would affect various operations therein.

Ice sheets can vary substantially in thickness from the time that equipment may be installed to the time of its retrieval. The usual method of installing monitoring equipment in such an unstable supporting environment is through the utilization of an elongated, narrow surface support strut or cable with the select instrument package affixed to the lower end thereof. The strut is lowered into a generally circular hole bored through the ice to the water therebeneath. The top of the strut is then secured on the surface of the ice. The diameter of the bore at the time of installation is of sufficient size for clearance of the instrument package lowered therethrough. However, during the intervening time period between installation and retrieval, the ice section will generally have increased in thickness and the normally water filled bore will have solidified around the relatively narrow support strut or cable. Such an occurrence severely isolates the generally expensive instrument package in the water therebeneath creating a formidable retrieval problem.

Retrieval of the monitoring equipment from an ice pack is both time consuming and expensive and is unnecessarily complicated by a solidly encased supporting structure. Such a condition is oftentimes dealt with by boring a second hole adjacent to the solidified first, wherein the strut may be forced through the wall thereof to allow retrieval through the second hole. Although effective in recovering the monitoring equipment, such efforts are both disadvantageously expensive and time consuming. The locale of the ice installation generally necessitates the use of a helicopter for transportation and construction purposes. A helicopter is exceedingly expensive on an hourly basis, and time spent for boring a second hole singularly useful for the removal of a strut in an adjacent hole is frequently deemed uneconomical. In some such situations, the equipment is thus abandoned. At other times, however, the immediate need of the equipment itself for critical diagnostic purposes or use at other locations necessitates this expensive and cumbersome retrieval process.

It would be an advantage therefore, to avoid the problems of prior art methods and apparatus for installing equipment and related hardware in ice, to provide an inflatable bladder for interpositioning between the hardware and the walls of the ice wherein ice build-up normally occurs. The invention of the present method and apparatus is provided just for such a purpose. The equipment retrieval technique provided therewith is much more efficient than that of the method of allowing the equipment to be solidified within the ice in which it is originally freely positioned. Additionally, all of the equipment including apparatus such as an inflatable bladder disposed within the ice may be recovered quickly for subsequent use in a much more efficient and economical manner.

SUMMARY OF THE INVENTION

The invention relates to a method of and apparatus for preventing fluid solidification in a normally fluid filled cavity, which includes a fluid displacing expansion member for positioning in the cavity. More particularly, one aspect of the invention includes an elongated inflatable bladder adapted for positioning through, and displacing water within, a water filled cavity subject to solidification through freezing. The bladder generally comprises a flaccid structure of sufficient size, which, when expanded by inflation with a pressure fluid such as air, will fill the region of a select void where ice accumulation might occur. The bladder, in its inflated condition, thus displaces ostensibly undesirable fluid, such as water, subject to solidification through freezing, with an easily removable structure.

In another aspect, the invention includes an elongated inflatable sleeve for encompassing a structure adapted for immersion into water in a subfreezing environment. The encompassed structure may include a support strut having current monitoring equipment and/or other similar equipment disposed on its lower end and constructed for positioning within a hole formed in a layer of ice for immersion in a body of water therebelow. Such an environment is normally subject to solidification and entrapment of the structure disposed therein. Inflation of the sleeve about the encompassed structure displaces the water normally present therearound and prevents the condition of being frozen therein. Similarly, contraction through deflation of the bladder facilitates removal of the structure without encountering undesirable ice accumulations therearound.

In still another aspect, the invention includes an inflatable bladder having baffles formed therein. The baffles comprise transversely positioned bulkhead members which substantially isolate longitudinal sections of the bladder. In this manner the circulation of air currents is restricted. Such air currents, induced by temperature differentials between the upper and lower bag environments normally cause ice growth along the length of the bladder independent of the ice sheet growth unless in some manner substantially contained within segregated regions therealong. Such baffles may include flaccid membranes, suitably apertured for air passage during inflation and/or foam bulkheads suitably collapsible for substantial collapse and disassembly of the bladder for retrieval of it and the structure encompassed therein.

In yet another aspect, the invention includes an inflatable bladder adapted for displacing water in a normally flooded void to prevent ice accumulation therein and allow relative movement between the walls of the void and a stationary member disposed therethrough. In such a manner, a structure upstanding from the floor of a body of water may be positioned to extend through a hole in a sheet of ice thereabove. The bladder being interposed between the sidewalls of the ice and the upstanding structure therein displaces both water and ice therearound with a compressible cushion facilitating some degree of relative movement therebetween without imparting serious stress levels thereto.

BRIEF DESCRIPTION OF THE DRAWINGS

For a more complete understanding of the present invention and for further objects and advantages thereof, reference may now be had to the following description taken in conjunction with the accompanying drawings, in which.

DETAILED DESCRIPTION

Figure 1:
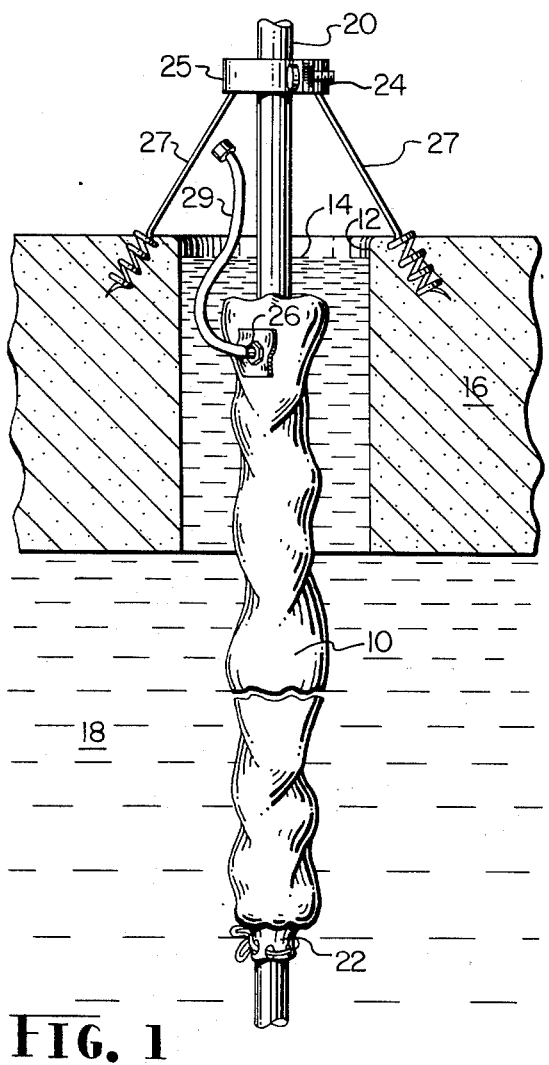
FIG. 1 is a side, elevational view of an inflatable bladder constructed in accordance with the principles of the present invention and disposed within a water filled aperture in conjunction with a supporting structure extending therethrough.
Figure 2:
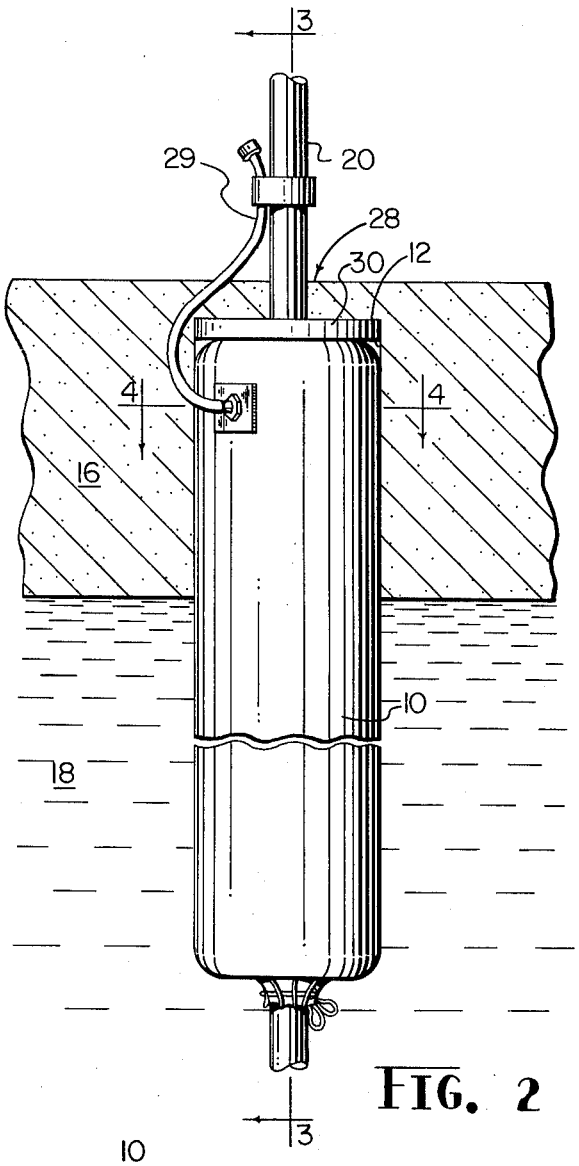
FIG. 2 is a side, elevational view of the inflatable bladder if FIG. 1 in an inflated condition substantially displacing the water in the aperture and preventing the solidification thereof around the supporting structure therein.

Referring first to FIGS. 1 and 2 in combination, there are shown side elevational views of one embodiment of a method of and apparatus for substantially preventing fluid solidification in an aperture in accordance with the principles of the present invention. The method and apparatus therein illustrated includes the positioning of an expansion member in the form of an inflatable bladder 10 in an aperture, or cavity 12 filled with fluid such as water 14 subject to freezing wherein said water is displaced prior to solidification. In the particular environmental application shown and described herein the cavity 12 comprises an open ended borehole in a sheet of ice 16 floating upon a body of water 18, which physical and environmental conditions are indigenous to North Atlantic and Artic areas where oil exploration is prevalent and icing of such man-made apertures is undesirable. It should be noted that the term "cavity" as used herein may also refer to a void to be formed in a fluid mass subject to solidification therearound.

Referring singularly now to FIG. 1, there is shown an elongated structure in the form of a support strut 20 positioned in and extending through the ice aperture 12. The bladder 10 is secured about the strut 20, encompassing it circumferentially therearound along a longitudinally disposed portion immersed in a region of water 14 subject to eventual freezing. The bladder 10 is preferably secured to the strut 20 through a laced neck region 22, or the like. Similarly, the strut is preferably secured to the ice 16 through a bracing fixture 24, or the like, providing the capacity for retaining the bladder 10 in the aperture 12 during inflation when buoyancy forces of water 18 would tend to force it upwardly out of said aperture. Bracing fixture 24 may be of conventional design providing means for securing the strut 20 and ice 16 in fixed relative positioning such as through an attachment bulkhead 25 and depending rotatable ice screws 27, or the like.

The bladder 10 is preferably comprised of a flaccid material such as "Neoprene" which is compatible with the environmental applications set forth herein. Such a collapsible construction, as shown in FIG. 1, facilitates transportation and handling in areas of extreme environmental conditions where weight and size are important factors. Similarly, the bladder 10 is constructed for expeditious on site assembly and disassembly through the inflation and deflation thereof. An inflation pressure fluid fitting 26 is thus provided in the vicinity of the upper surface thereof for communication with a pressure fluid line 29 connecting the bladder 10 with inflation and/or inflation pressure monitoring equipment (not shown), on the surface of the ice 16. The pressure fluid is preferably a gas which is compatible with the inflatable bladder. For example, air has been found to be a satisfactory pressure fluid when provided in a relatively, moisture free condition. The fitting 26 may thus be a conventional type inflation valve sealedly affixed to the bladder 10. In this manner conventional equipment may be utilized for the construction of the apparatus described herein, for monitoring bladder pressure, and/or practicing the method of the invention as defined in more detail below.

Referring now to FIG. 2, there is illustrated the bladder 10 in a fully inflated condition and displacing substantially all of the water 14 in the aperture 12. A relatively thin layer of ice 28 has preferably been allowed to form across the top of the aperture 12. In this manner the inflated bladder 10 is insulated from surface temperature extremes, structurally secured and environmentally protected from wildlife such as foxes and rodents on the surface. It may be observed that once inflated, friction between the walls of the aperture 12 and bladder 10 will ostensibly retain it therein. However, the ice 28 and a retaining disc 30, which is shown beneath and contiguous to ice 28 to interface between said ice 28 and the bladder 10, preferably insures the security and protection thereof. Since the bladder is so retained within the aperture 12, the bracing fixture 24 has been removed and only the strut 20 upstands from the concealed bladder-filled aperture therebelow. The lower end of the strut 20 may then support an instrument package, such as current monitoring equipment, a hydrophone or the like (not shown) for an indefinite period of time. It may be seen that the diameter of the aperture 12 is generally directly related to the diameter of such equipment for installation clearance purposes. Retrieval of such equipment is then effectively facilitated by chipping away ice covering 28, removing disc 30, and deflating the bladder 10, wherein the aperture 12 will substantially return to its original water-filled configuration allowing unrestricted retraction of the strut 20 therefrom. The outer surface of the bladder 10 is preferably treated with a conventional substance for preventing adhesion to the ice and facilitating removal therefrom.

The length of the bladder 10 need only be as long as the area of potential solidification of water therearound. However, because sheets of ice 16 in Artic waters may grow in depth from the time of installation to retrieval, the bladder 10 must be sufficiently long to withstand this growth. Similarly, the bladder 10 must be constructed so as to not itself cause ice accumulation beneath the ice sheet 16. Such ice accumulation can occur through convection air currents imparted by the temperature differentials in the bladder itself which can carry the heavier subfreezing, upper air contiguous to the ice 16, to the lower regions of the bladder 10 contiguous to the relatively warmer water 18. The subfreezing air could then cause the water outside the lower bladder portion to solidify therearound. For this reason, the bladder 10 is preferably constructed for restricting the free movement of such convection currents. Similarly, the top of the bladder 10 is preferably buried beneath the surface of the ice 16 so as to not contact the much colder surface air.

Figure 3:
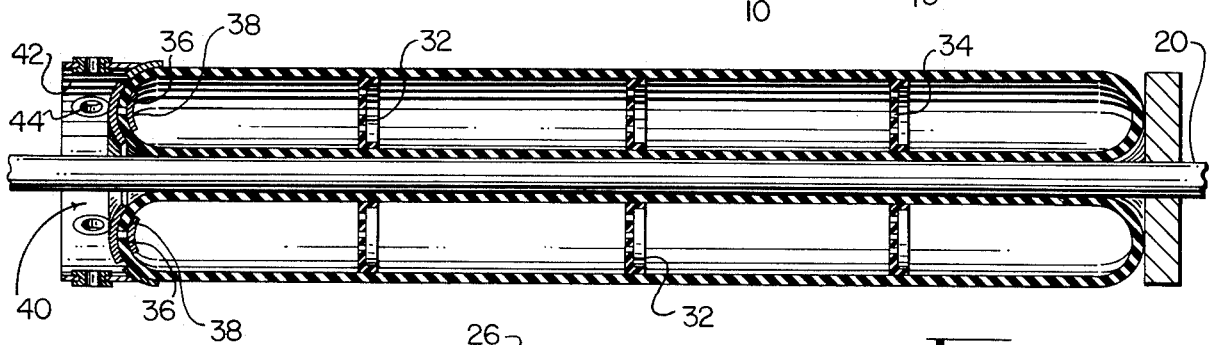
FIG. 3 is a side, elevational cross-sectional view of the inflated bladder of FIG. 2 taken along the lines 3—3 thereof and illustrating one embodiment of the construction thereof.

As shown most clearly in FIG. 3, wherein a longitudinal cross-sectional view of the inflated bladder of FIG. 2 is illustrated, a series of baffles 32, or the like, are provided in the inflation region of the bladder 10. The baffles 32 may be comprised of membranes having perforations 34, or the like, therein for allowing forced air passage during inflation and deflation thereof. The baffles 32 are preferably constructed of flaccid material to further provide the collapsibility characteristics of the bladder 10 and the advantages thereof.

Figure 4:
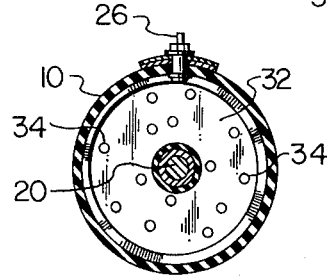
FIG. 4 is a top plan, cross-sectional view of the inflated bladder of FIG. 2 taken along the lines 4—4 thereof and further illustrating one embodiment of the construction thereof.

Referring now to FIGS. 3 and 4 in combination, it may be seen that the particular embodiment of the bladder 10 shown and described herein is constructed in an elongated annular configuration for adapting to and receiving a strut 20, or the like, through the center annulus thereof. This construction is preferably effected by fabricating a generally cylindrical sleeve of the desired outside diameter and pulling one end of the sleeve through itself until the originally opposed longitudinal ends are juxtaposed. As shown most clearly in FIG. 3, a generally circular end portion 36 abuts a generally circular end portion 38 across the lower face 40 of the bladder 10. Lower face 40, shown in the laced configuration of FIGS. 1 and 2, may be seen to be comprised of an airtight sealed interengagement of end portions 36 and 38 and an outer skirt 42 therearound. Skirt 42 is preferably provided with a plurality of lacing eyelets 44 therein for facilitating the securement thereof to the strut 20. In like manner, a similar skirt and lacing element (not shown) may be provided for the upper end of the bladder 10 for additional securement to the elongated member extending therethrough.

In the particular application of encompassing a support strut as shown and described herein, the configuration of the expansion member in the form of the bladder 10 has been shown to be preferable. Numerous other applications of the method and apparatus of the present invention are wholly within the scope thereof. For example, the present invention may be utilized wherever material in a fluid state is present such as the pouring of material subject to solidification into molds. Also, in the present icing application, the strut 20 may simply be a cable (not shown) or similar fastening line connecting the water floor or an object beneath the ice 16 with the surface thereof, wherein the inflatable bladder 10 may serve also as a cushioning element for relative lateral movement between the cable and ice. Equally effective, the bladder 10 may be simply comprised of an inflatable member without the open ended annular region therethrough for utilization in water-filled apertures where structures are not needed to depend therethrough. Such applications may include conventional "moon pools" or drilling platforms and barges wherein solidification thereof is a potential hazard during periods of non-use. Although particular methods and apparatus for utilizing such embodiments of the present invention are not set forth in detail, it is believed that the specification set forth above would now make such applications of said invention an obvious variation of the art.

It is further believed that the operation and construction of the above-described invention and various applications thereof will be apparent from the foregoing description. Moreover, while the method and apparatus shown and described has been characterized as being preferred, it will be obvious that various changes and modifications may be made therein without departing from the spirit and scope of the present invention as defined in the following claims.

What is claimed is:

1. Apparatus for displacing a fluid within a cavity and preventing the solidification thereof around a removable structure disposed within the cavity, said apparatus comprising:
   an inflatable bladder positioned within the cavity, said bladder having a passage therethrough adapted to encompass the removable structure, said bladder being further adapted for inflation to a size and shape within the cavity for substantially filling the void thereof;
   means for inflating said bladder into a fluid displacement configuration to substantially displace fluid thereto disposed within the cavity;
   means for retaining said bladder within the cavity for maintaining the fluid displacement configuration therethrough and preventing the formation of solidified fluid therein; and
   means for deflating said bladder within the cavity to permit the retrieval of said bladder therefrom.

2. Apparatus as set forth in claim 1 wherein the cavity is an aperture formed through a sheet of ice, the fluid within the cavity is water, and the removable structure disposed within the aperture includes an elongated support strut having monitoring equipment depending from the end thereof and adapted for immersion into a body of water beneath the sheet of ice.

3. Apparatus as set forth in claim 2 wherein said bladder is adapted for ensleeving said strut substantially along the portion of the length thereof positioned within said aperture with said bladder further being constructed for concurrently engaging said strut around a first, upper end and around a second, lower end for supporting the expansion of sid bladder therebetween during displacement of water within said aperture.

4. Apparatus as set forth in claim 2 wherein said means for retaining said bladder within the cavity includes a support frame for positioning upon the surface of said ice and securement thereto to maintain said bladder within the cavity during inflation and the displacement of water therein.

5. Apparatus as set forth in claim 1 wherein said bladder comprises a flaccid, elongated bag, of generally annular construction having opposed longitudinal ends sealed circumferentially about the annulus thereof, and adapted for receiving through said annulus the elongated structure for which solidification therearound is to be prevented.

6. Apparatus as set forth in claim 6 wherein said elongated bag further includes means for fastening said opposed longitudinal ends thereof around longitudinally disposed portions of the elongated structure, between which portions said bladder is to be inflated therearound.

7. Apparatus as set forth in claim 5 wherein said elongated bag is air inflatable and includes a transversely positioned baffle within the inflation region thereof for restricting the free flow of convection air currents therein imparted by temperature differentials therealong.

8. A method for preventing the solidification through freezing of a water filled aperture comprising:
   providing an air inflatable bladder having a generally central annular passage in open ended communication therethrough, said bladder being adapted to receive a structure therein for extending from the surface of the ice to the body of water therebelow, the inflatable bladder being further adapted for being disposed within the aperture and extending to a size and shape which fills the void thereof;
   positioning the bladder within the aperture while the bladder is in a substantially deflated condition;
   inflating the bladder within said aperture and displacing the water therein;
   retaining the bladder within said aperture during inflation thereof; and
   securing the inflated bladder within the aperture for substantially maintaining the original cross-sectional configuration thereof during subfreezing environmental conditions and permitting the subsequent removal of the bladder therefrom.

9. A method as set forth in claim 8 wherein the bladder is adapted for being affixed to a structure received therethrough and wherein said step of retaining the bladder within the aperture includes the step of securing an upper end portion of the structure to the surface of the ice.

10. A method as set forth in claim 8 wherein the structure to be received within the bladder is a support strut for an instrument package attached to the end thereof and adapted for immersion in the water therebelow.

11. A method as set forth in claim 8 further including the step of providing means disposed within the bladder adapted to restrict the free flow of convection air currents therein imparted by temperature differentials therealong.

12. A method as set forth in claim 11 wherein a baffle element is employed within the bladder for restricting the convection currents therein.

13. A method as set forth in claim 8 wherein the step of securing the bladder within the aperture includes the step of allowing a layer of ice to form across the upper surface of the inflated bladder.

* * * * *